(12) United States Patent
Niknezhad

(10) Patent No.: US 10,520,091 B2
(45) Date of Patent: Dec. 31, 2019

(54) DOUBLE DIRECTION SEAL WITH LOCKING

(75) Inventor: Sidney Niknezhad, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 2023 days.

(21) Appl. No.: 12/828,143

(22) Filed: Jun. 30, 2010

(65) Prior Publication Data

US 2011/0006486 A1 Jan. 13, 2011

Related U.S. Application Data

(60) Provisional application No. 61/223,947, filed on Jul. 8, 2009.

(51) Int. Cl.
*F16J 15/3212* (2016.01)
*F16J 15/3232* (2016.01)
*F16J 15/3236* (2016.01)

(52) U.S. Cl.
CPC ....... *F16J 15/3212* (2013.01); *F16J 15/3232* (2013.01); *F16J 15/3236* (2013.01)

(58) Field of Classification Search
CPC .. F16J 15/3208; F16J 15/3212; F16J 15/3216; F16J 15/3232; F16J 15/3236; F16J 15/3252; F16J 15/3268
USPC ............. 277/353, 551, 561, 562, 566, 572
See application file for complete search history.

(56) References Cited

U.S. PATENT DOCUMENTS

| | | | |
|---|---|---|---|
| 2,088,703 A * | 8/1937 | Hubbard | ............... F16C 33/74 126/314 |
| 3,901,517 A * | 8/1975 | Heathcott | ..................... 277/556 |
| 4,655,945 A | 4/1987 | Balsells | |
| 4,804,290 A | 2/1989 | Balsells | |
| 4,805,943 A | 2/1989 | Balsells | |
| 4,915,366 A * | 4/1990 | Balsells | ................. F16F 1/045 267/167 |
| 5,072,070 A | 12/1991 | Balsells | |
| 5,079,388 A | 1/1992 | Balsells | |
| 5,091,606 A | 2/1992 | Balsells | |
| 5,117,066 A | 5/1992 | Balsells | |
| 5,134,244 A | 7/1992 | Balsells | |
| 5,161,806 A | 11/1992 | Balsells | |
| 5,265,890 A | 11/1993 | Balsells | |
| 5,358,224 A | 10/1994 | Balsells | |
| 5,474,309 A | 12/1995 | Balsells | |
| 5,575,487 A | 11/1996 | Balsells | |
| 5,599,027 A | 2/1997 | Balsells | |
| 5,799,953 A * | 9/1998 | Henderson | ........... F16J 15/3236 277/554 |
| 5,979,904 A * | 11/1999 | Balsells | ...................... 277/554 |

(Continued)

*Primary Examiner* — Nicholas L Foster
(74) *Attorney, Agent, or Firm* — Klein, O'Neill & Singh, LLP

(57) ABSTRACT

Lip type rotary seal assemblies are generally discussed herein and particularly those with double directional sealing, wherein the tip of the two sealing lips point in opposite directions. A locking ring is incorporated to retain the seal assembly in the housing. The seal is configure to provide different sealing forces at each end to provide flexibility and enhanced performance where two different conditions on each side of the seal can exist, such as different sealing medium, fluid viscosity, pressure, and rotary speed.

7 Claims, 4 Drawing Sheets

(56) References Cited

U.S. PATENT DOCUMENTS

| | | | |
|---|---|---|---|
| 5,984,316 A * | 11/1999 | Balsells | F16J 15/3212 277/553 |
| 5,992,856 A | 11/1999 | Basells et al. | |
| 6,050,572 A * | 4/2000 | Balsells | F16J 15/3216 277/551 |
| 6,161,838 A * | 12/2000 | Balsells | 277/511 |
| 6,264,205 B1 * | 7/2001 | Balsells | 277/551 |
| 6,616,146 B2 * | 9/2003 | Friend | F16J 15/322 277/560 |
| 6,641,141 B2 | 11/2003 | Schroeder | |
| 6,997,285 B2 * | 2/2006 | Downes | F16J 15/3252 184/105.3 |
| 7,210,398 B2 | 5/2007 | Balsells | |
| 7,464,750 B2 | 12/2008 | Schapel et al. | |
| 7,513,506 B2 * | 4/2009 | Kondo | F02M 59/442 277/353 |
| 7,717,432 B2 * | 5/2010 | Kondo | F02M 59/442 277/353 |
| 7,753,376 B2 * | 7/2010 | Kondo | F02M 59/442 277/353 |
| 7,959,159 B2 * | 6/2011 | Hooker et al. | 277/559 |
| 8,096,559 B2 * | 1/2012 | Cook | 277/353 |
| 8,123,229 B2 * | 2/2012 | Eguchi | F16J 15/3236 277/558 |
| 8,215,646 B2 * | 7/2012 | Castleman | F16J 15/166 277/552 |
| 8,328,202 B2 | 12/2012 | Foster et al. | |
| 8,544,850 B2 * | 10/2013 | Balsells | F16J 15/166 277/511 |
| 8,684,362 B2 | 4/2014 | Balsells et al. | |
| 9,194,497 B2 * | 11/2015 | Rastegar | F16J 15/3212 |
| 9,234,591 B2 | 1/2016 | Dilmaghanian et al. | |
| 9,285,034 B2 | 3/2016 | Balsells et al. | |
| 9,357,684 B2 | 5/2016 | Foster | |
| 2002/0153664 A1 * | 10/2002 | Schroeder | 277/551 |
| 2005/0093246 A1 * | 5/2005 | Dietle | F16J 15/008 277/549 |
| 2005/0167928 A1 * | 8/2005 | Park | C08J 3/246 277/560 |
| 2006/0022414 A1 * | 2/2006 | Balsells | F16J 15/3268 277/572 |
| 2006/0071430 A1 * | 4/2006 | Downes | F16J 15/324 277/549 |
| 2007/0222157 A1 * | 9/2007 | Kondo | F02M 59/442 277/345 |
| 2008/0122184 A1 * | 5/2008 | Hocker | F02M 59/442 277/366 |
| 2009/0166981 A1 * | 7/2009 | Kondo | F02M 59/442 277/549 |
| 2009/0267306 A1 * | 10/2009 | Eguchi | F16J 15/3236 277/562 |
| 2010/0237565 A1 | 9/2010 | Foster | |
| 2010/0237566 A1 * | 9/2010 | Balsells | F16J 15/166 277/550 |
| 2011/0006486 A1 | 1/2011 | Niknezhad | |
| 2013/0043661 A1 | 2/2013 | Binder et al. | |
| 2014/0312570 A1 | 10/2014 | Foster | |
| 2015/0061227 A1 * | 3/2015 | Rastegar | F16J 15/3212 277/309 |
| 2016/0047473 A1 | 2/2016 | Foster et al. | |
| 2016/0223086 A1 | 8/2016 | Balsells et al. | |
| 2017/0172018 A1 | 6/2017 | Dilmaghanian et al. | |
| 2017/0261108 A1 | 9/2017 | Soler et al. | |
| 2017/0328474 A1 | 11/2017 | Balsells | |
| 2018/0112778 A1 | 4/2018 | Dilmaghanian et al. | |
| 2018/0119857 A1 | 5/2018 | Balsells | |
| 2018/0266562 A1 | 9/2018 | Balsells | |

* cited by examiner

DOUBLE DIRECTION SEAL WITH LOCKING

CROSS-REFERENCED TO RELATED APPLICATION

This is a regular utility application of Provisional Application Ser. No. 61/223,947, filed Jul. 8, 2009, the contents of which are expressly incorporated herein by reference.

FIELD OF ART

Lip type rotary seals are generally discussed herein and particularly those with double directional sealing that are energized and optionally include a locking ring to retain such spring and seal assembly in the housing.

BACKGROUND

Rotary seals are known from U.S. Pat. No. 6,264,205 issued Jul. 24, 2001 and U.S. Pat. No. 6,161,838 issued Dec. 19, 2000. In such patents, unidirectional seals are disclosed that are either stacked or used as a single seal and pressed into a housing.

SUMMARY

A double direction seal assembly with locking means offers significant advantages in that it permits the combining of a primary seal with a secondary seal whereby the primary seal is configured to withstand the higher pressure while the secondary seal is exposed to the lower pressure. Double direction seals also permit use in different sealing conditions, such as different mediums, different viscosities, different speeds, etc.

The locking ring may be made from different materials such as plastic and metal, or combinations of plastic and metal. When plastic locking rings are used, the selection of the locking ring material should be one that has a high modulus, such as the high performance plastic PEEK, to provide better locking action. That is, it will require higher force to assemble and higher force to disassemble. The same would be true when using a metallic ring. High modulus metallic rings would require higher force to assemble and retain the seal to the seal chamber or box than lower modulus metals. High modulus metals include various kinds of steel and low modulus metals include such materials as aluminum and copper alloys. The seal body may be made from any elastomer or thermoplastic elastomer material suitable for the application or service.

The type of locking ring design is variable and modification of which may be incorporated to facilitate assembly of the seal into the housing. As further described below, locking rings without or with cantilever beams may be used.

The double direction seal assembly with outside diameter ("OD") locking features, such as means along an outer periphery for locking against a seal chamber, is a rotary lip-type seal that offers sealing in both directions with the ability to provide different sealing capabilities under different conditions of pressure, sealing medium, and rotary speed at each side of the seal. A locking ring is incorporated that retains the seal in the housing by creating interference between the locking ring and the housing. The disclosed embodiments will allow for a single seal assembly to provide sealing in two different directions, apply a different sealing pressure in each direction, and retain itself in the housing.

A further feature of the present assembly and method is a double direction seal assembly that permits sealing in one direction as well as another direction. The seal assembly comprises a primary and a secondary seal arranged in opposing directions. The primary seal is generally the one that is able to withstand higher pressures and higher speeds than the secondary seal. The different directions are generally defined by the direction that respective seal tips point.

An additional feature of the present assembly and method is a double direction seal assembly having locking means for retaining the seal to the housing by creating interference between the OD of the locking ring and the ID of the housing. Along the inside diameter (ID), one or more voids or spaces are provided between the shaft and the seal body.

A yet additional feature of the present assembly and method is a double direction seal assembly having a locking circular ring made from a metallic material with variable modulus of elasticity. In a specific example, the variable modulus of elasticity is a notch forming a beam for biasing against the housing.

A still yet additional feature of the present assembly and method is a double direction seal assembly comprising a circular locking ring made from a plastic material that will create interference between the OD of the locking ring and the ID of the housing. Such locking ring may be made from a high modulus plastic, such as PEEK, to create a higher degree of interference and retention between the locking ring and the housing.

A yet additional feature of the present assembly and method is a double direction seal assembly with a circular locking ring that provides locking action between the seal assembly and the housing. Such locking seal assembly can have the locking ring going into the housing in first direction or in a reversed direction, opposite the first direction, with the intended purpose of sealing in both directions with a primary seal being located in one position or in the opposite position. The primary seal is defined as the seal that generally seals the most important fluid and generally subject to higher pressures and speeds. The secondary seal generally provides sealing for low pressure or prevent the contaminants from getting into the primary seal area.

DESCRIPTION OF DRAWINGS

These and other features and advantages of the present assemblies and methods will become appreciated as the same become better understood with reference to the specification, claims and appended drawings, wherein:

DETAILED DESCRIPTION

The detailed description set forth below in connection with the appended drawings is intended as a description of embodiments of seal assemblies and methods for making the same and is not intended to represent the only forms in which the present assemblies and methods may be constructed or used. The description sets forth the features and the steps for using and constructing the seal embodiments of the present assemblies and methods in connection with the illustrated embodiments. It is to be understood, however, that the same or equivalent functions and structures may be accomplished by different embodiments that are also intended to be encompassed within the spirit and scope of the assemblies and methods. As denoted elsewhere herein, like element numbers are intended to indicate like or similar elements or features.

As used herein, the term first, second, proximal and distal are relative terms intended to distinguish different components or features by name only but are not otherwise limiting unless the context indicates otherwise.

Figure 1:
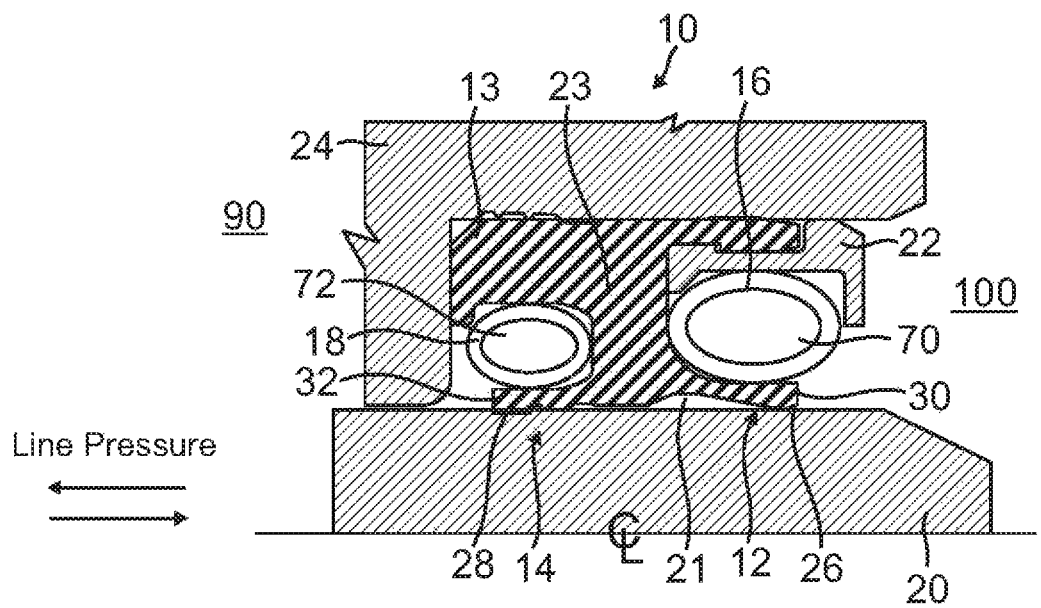
FIG. 1 shows a cross section of a double direction seal assembly with O.D. locking means.

FIG. 1 shows a cross section of a seal assembly 10 with outside diameter (O.D.) locking features and with a redundant seal. In one example, the seal assembly 10 is referred to as a double direction seal assembly since it incorporates two seals. In one embodiment, the seal assembly 10 comprises a primary seal 12 energized by a spring 16 and a secondary seal 14 energized by a second spring 18. The seal assembly 10, and more particularly the primary and secondary seals, forms a seal against the shaft 20. A locking ring 22 is used to retain the seal assembly 10 in the housing 24 and retains the primary spring 16 within the seal cavity 70 of the primary seal 12. The second spring 18 is located in a second seal cavity 72. The seal body 13 and/or the locking ring 22 also seal against the housing so that the entire seal chamber is sealed from leakage along the shaft and along the interior surface of the housing 24. As shown, the first cavity 70 is larger than the second cavity 72 for accommodating a spring with larger spring coils than for the spring for use in the second cavity. In some examples, the two cavities are generally the same size.

The primary seal 12 and the secondary seal 14 each has a sealing lip 26, 28, respectively, for sealing against the shaft 20 and each comprising a sealing tip 30, 32. As used herein, the term energized or energizer is understood to mean bias or exerted by a force, which may be in the form of pressure, spring force, or resilient force. For example, an O-ring may be considered an energizer because of its resilient characteristics allowing it to energize the seal lip. A canted coil spring may also be considered an energizer because of its spring force and/or resilient force enabling it to exert a force against the seal lip. The term double direction seal is understood to mean a seal made from one or more parts that has two sealing lips and wherein the sealing tips of the two sealing lips face in opposite directions to provide sealing in two different directions. Thus, as shown in FIG. 1, the seal assembly 10 may be used in the orientation depicted when line pressure or high pressure is from the first region 90 or the second region 100.

Thus, an aspect of the present assembly and method is understood to include a seal body 13 comprising two cavities each defined in part by a sealing lip 26, 28, and wherein the two sealing lips 26, 28 each includes a tip 30, 32 that points opposite directions. In a further aspect of the present assembly and method, a spring 16 and/or 18 is located in at least one of the two cavities. The seal assembly 10 further includes one or more voids 21 formed between the seal body 13 and the shaft 20. In another example, the seal body 13 is singularly made or formed, i.e., a unitary formed body. In yet another example, the singularly formed body is attached to a locking ring 22, which together define one of the cavities for accommodating a spring. To energize the seal lips 26, 28 in the radial direction, perpendicular to the axis of the shaft, the springs 16, 18 are radial canted coil springs. The seal body may be made from a rubber material, an elastomer, or a thermoplastic elastomer (TPE). Exemplary materials include high performance Polyurethane, Nitrile, VITON®, H-Nbr, PTFE TEFLON®, filled PTFE, AFLAS®. HYTREL®, KALREZ®, EPDM, silicone, Nylon, NYLATRON®, POM, UHMWPE, TEFZEL, and PEEK. The locking ring 22 is preferably made from a high modulus plastic, such as high performance plastic PEEK (polyetheretherketone), PEK (polyetherketone). PA (polyamides), and ABS (acrylonitrile butadiene styrene). In the example shown, the seal body 13 has two axially extending seal lips 26, 28 that extend in opposite directions and share a common seal divider 23. In another example, the seal divider has a thickness that is at least two times to ten times thicker than the thickness of the seal lip.

Figure 2:
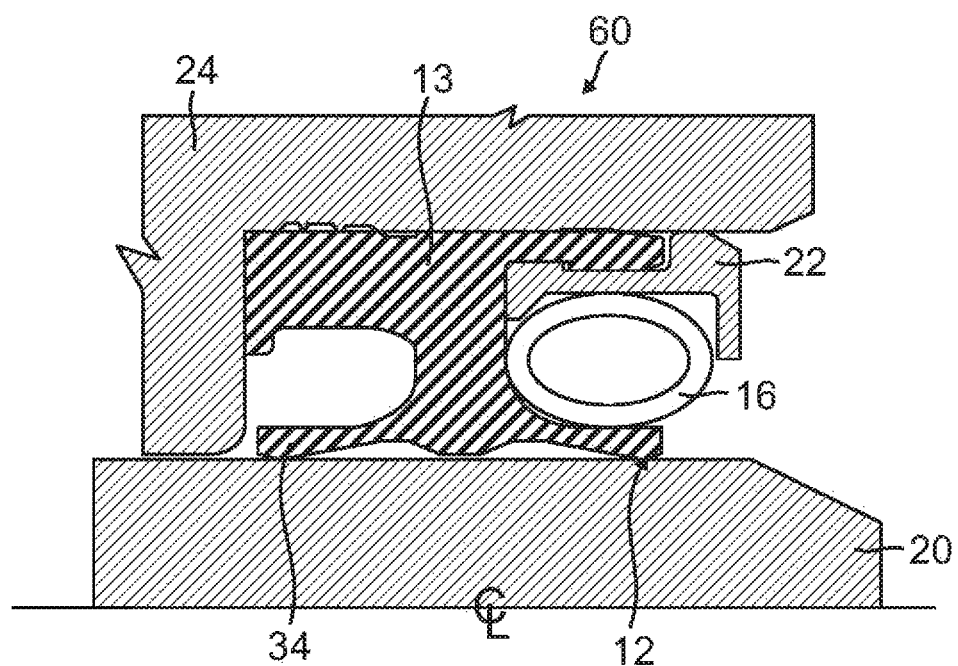
FIG. 2 shows a cross section of a double direction seal assembly with secondary memory lip.

FIG. 2 shows a cross section of a double direction seal assembly 60 with secondary memory lip similar to that of FIG. 1 with the exception that the secondary seal 14 and spring 18 that energizes the secondary seal is replaced with a secondary memory lip 34. The memory lip 34 is self-biasing against the shaft to seal against the shaft without the need for an energizer. Optionally, the secondary memory lip 34 may be used with an energizer. The seal body 13, having the secondary memory lip, may be made from various polymers known to exhibit shape memory, such as shape memory polyurethane elastomer and poly (glycerol-sebacate) elastomer. In a specific example, the memory lip is made from a shape memory main-chain smectic-C elastomer, such as that described in US publication No. 2009/0240075, the contents of which are expressly incorporated herein by reference. The seal body 13 may be singularly formed from a shape memory polymer material or made from two or more components and assembled into an integral unit.

Figure 3:
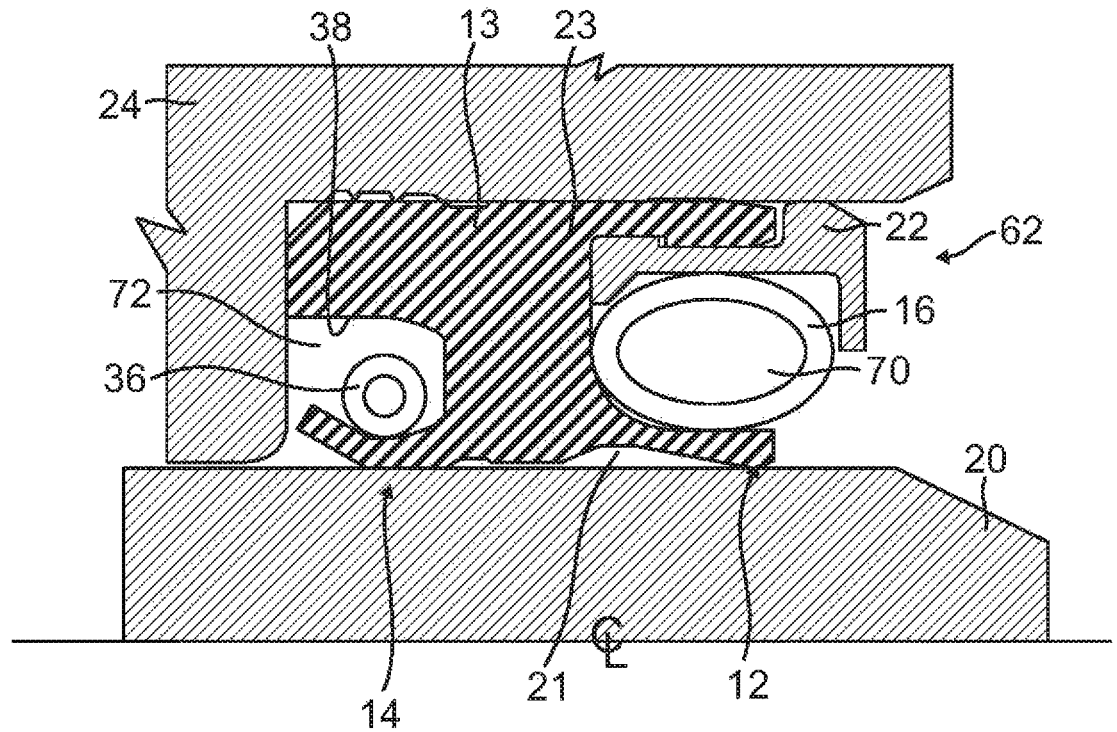
FIG. 3 shows a cross section of a double direction seal assembly with secondary memory lip seal memory energized.

FIG. 3 shows a cross section of a double direction seal assembly 62 with secondary memory lip seal memory energized, similar to that of FIGS. 1 and 2, with the exception that the spring used to energize the secondary seal is replaced with an extension spring 36, for example a helical coil spring connected in a garter-shape configuration. The extension spring 36 stretches over the secondary seal lip 14 and biases against it but otherwise does not bias against the upper cavity surface 38 of the second cavity 72.

Figure 4:
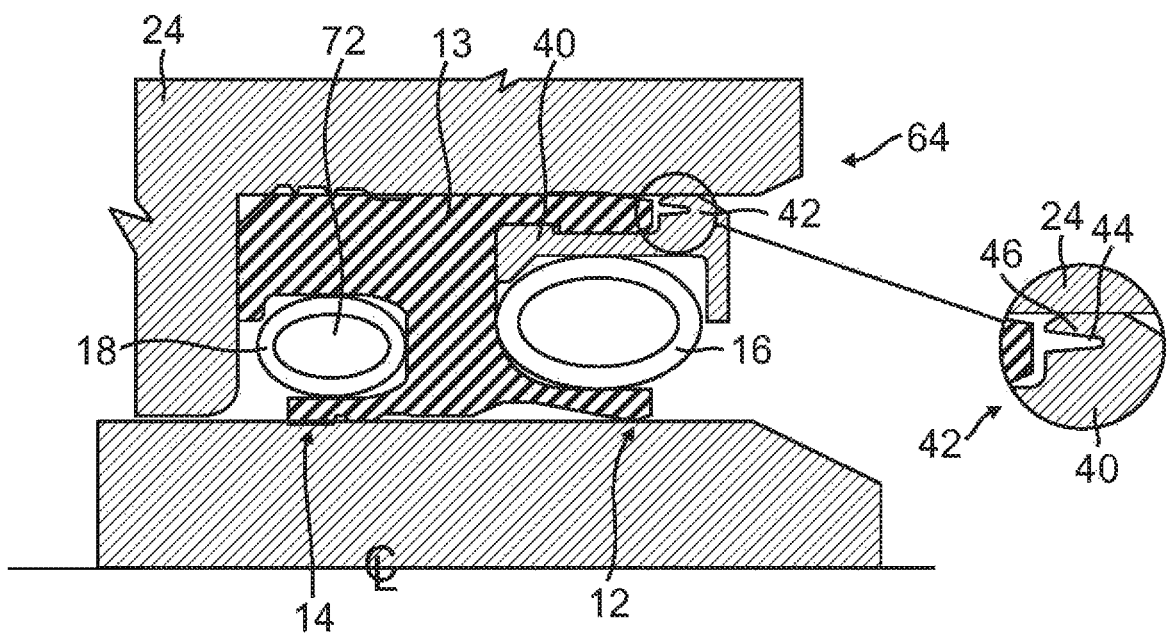
FIG. 4 shows a cross section of a double direction seal assembly with a metal ocking ring with cantilever beam locking ring on rear end.

FIG. 4 shows a cross section of a double direction seal 64 with a metal locking ring 40, which is the same as that shown in FIG. 1 with the exception that the locking ring 40 incorporates a rear end cantilever beam locking ring 42. As shown in the enlarged blown up view adjacent FIG. 4, the locking ring 40 comprises a notch 44, which forms a beam 46 located adjacent the housing. The beam 46 has a tip that points in the direction of the secondary seal 14. The beam 46 acts as a leaf spring and biases against the housing 24. Thus, the locking ring 40 engages the housing by way of interference in addition to biasing against the housing by way of the beam 46. The metal used to form the locking ring may be stainless steel, other high modulus metal, or an alloy, such as Hastelloy, Inconel, or other chromium based alloys.

Figure 5:
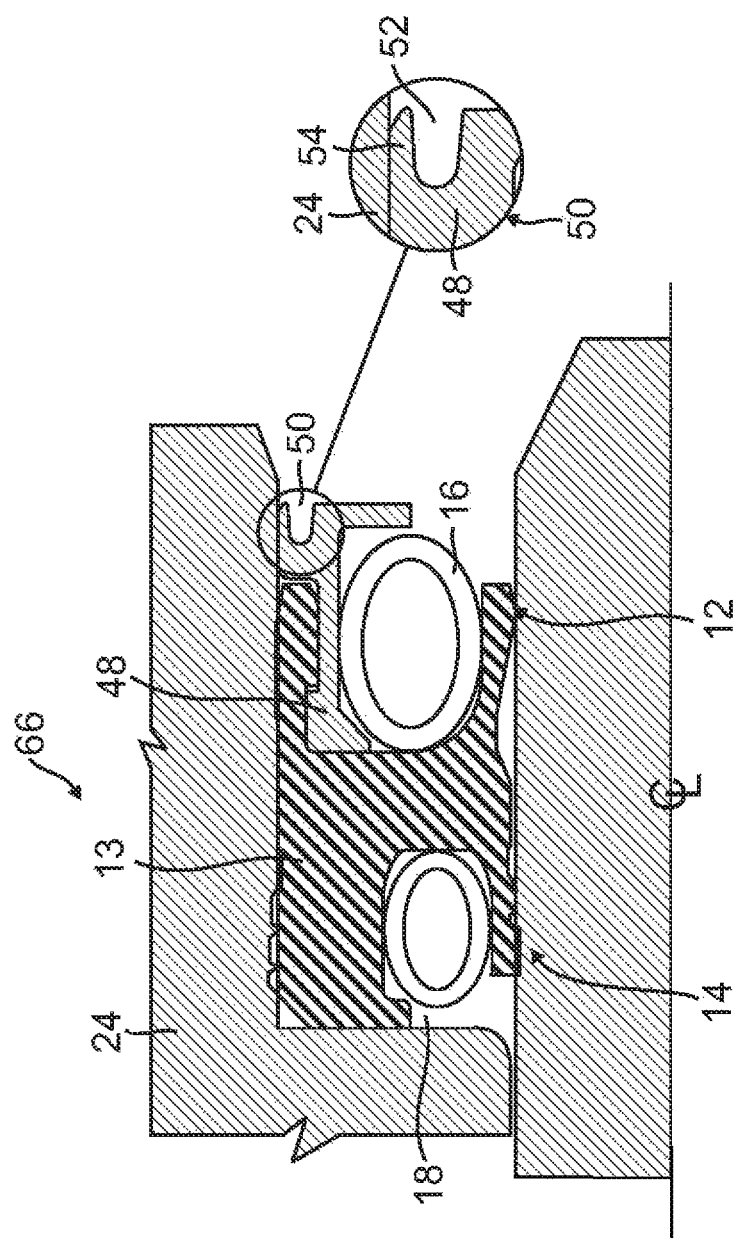
FIG. 5 shows a cross section of a double direction seal assembly with a metal locking ring with cantilever beam locking ring on the front end.

FIG. 5 shows a cross section of a double direction seal assembly 66 with a metal locking ring 48 that is the same as that shown FIGS. 1 and 4 with the exception that the locking ring is replaced with a front end cantilever beam locking ring 50. As shown in the enlarged blown up view adjacent FIG. 5, the locking ring 50 comprises a notch 52, which forms a beam 54 located adjacent the housing 24. The beam 54 has a tip that points in the direction away from the secondary seal 14. The beam 46 acts as a leaf spring and biases against the housing 24. Thus, the locking ring 50 engages the housing by way of interference in addition to biasing against the housing by way of the beam 54.

Figure 6:
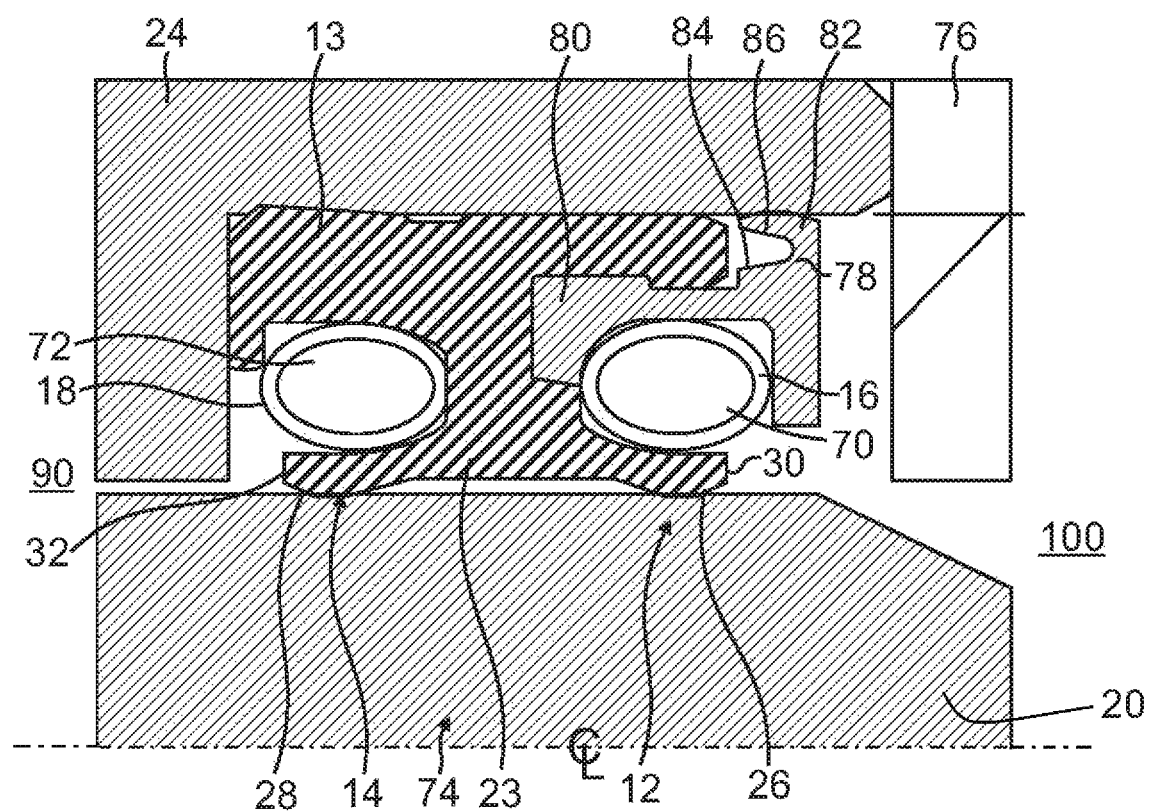
FIG. 6 shows a cross section of a double direction seal assembly with a locking ring defining a substantial portion of a ring cavity and the geometry of that cavity. The locking ring can optionally incorporate a cantilever beam having a beam tip that points in a first direction or a second direction.

FIG. 6 shows a cross section of a double direction seal assembly 74 provided in accordance to another example. As shown, the seal assembly 74 is positioned in a seal box comprising a housing 24 and a flange 76. The seal assembly 74 is arranged so that the secondary seal 14 is positioned closest to a first region 90 and the primary seal 12 is positioned closest to the second region 100, which may be at a higher pressure than the first region 90. In one example, the first region 90 may have saline, water, steam, or detergent at a first pressure and the second region may have oil or grease at a second pressure, which is higher than the first pressure.

As shown, the seal assembly comprises a seal body 13 comprising a primary seal lip 26 having a tip 30 and a secondary seal lip 28 having a tip 32. The two seal lips 26, 28 partially define two adjacent cavities 70, 72. As shown, a locking ring 78 engages the seal body 13 to partially define cavity 70. The locking ring 78 comprises a backing flange 80 that wedges in a corner section of the first cavity 70 and forms a substantial part of the geometry for receiving the primary spring 16. In one example, the backing flange 80 is wedged and secured to the seal body 13 by the corner section of the seal body. Thus, in the present example, the locking ring 78 forms part of the common seal divider 23. Said differently, the elastomer or TPE that forms the common seal divider 23 has two different thicknesses. As shown, the overall thickness of the common seal divider 23 is made from the combination of the seal body 13 and the locking ring 78.

The locking ring 78 preferably incorporates a cantilever beam 82, which is formed by incorporating a notch 84 in the locking ring. The cantilever beam 82 further comprises a beam tip 86 that points in the first region 90. In another example, the beam tip 86 points in the direction of the second region 100.

The double direction seal with OD locking ring, such as locking means for locking the seal body to the housing, is a rotary lip-type seal that offers sealing in both directions with the ability to provide different sealing capabilities under different conditions of pressure, sealing medium, and rotary speed at each side of the seal. A locking ring is incorporated that retains the seal body in the housing by creating interference between the locking ring and the housing. The apparatus and method will allow for a single seal assembly to provide sealing in two different directions, apply a different sealing pressure in each direction, and retain itself in the housing.

Aspects of the present method are understood to include a method for forming a double-direction seal assembly and a method for using the seal assembly in a seal box or seal chamber. In one example, the method comprises forming a seal body comprising two sealing lips located adjacent a respective seal cavity. The sealing lips each comprises a seal tip that points in opposite directions. In a specific example, the seal tips point in 180-degree directions. In another example, the seal body is unitarily formed. In another example, the seal body is made from two different materials that are attached to one another to form an integral unit. In yet another example, the seal body is formed from a shape memory elastomer or TPE material.

The method further comprises placing at least one energizer in one of the seal cavities. In one example, the energizer is a canted coil spring, such as a radial canted coil spring. In another example, the energizer is an O-ring. In still yet another example, a spring is placed into each of the two seal cavities. In one embodiment, a canted coil spring is placed in the seal cavity next to a primary lip seal and an extension spring is placed in the seal cavity next to the secondary lip seal.

The method further comprises placing a locking ring in engagement with the seal body and the housing of the device or machine to be sealed. The locking ring preferably defines part of the cavity adjacent the primary seal lip. The locking ring preferably has an outer surface feature that mechanically engages the seal body. The locking ring preferably has additional outer surface feature for engaging the housing. In one example, the additional outer surface feature for engaging the housing comprises a cantilever member comprising a recess defining a beam and wherein the beam biases against the housing. In another example, the beam is rear racing. In yet another example, the beam is front facing. In still yet another example, the locking ring is omitted and the seal body engages the housing interference fit.

Although limited embodiments of the seal assemblies and their components have been specifically described and illustrated herein, many modifications and variations will be apparent to those skilled in the art. For example, the various seal bodies may be formed using multiple components, different materials, and different features while still maintaining a double direction seal characteristic. The locking ring may also engage the seal body and/or the housing different engagements than as described. As noted above, the locking ring may also be eliminated altogether by properly sizing the seal body to engage the housing and providing a lip to retain the primary spring. Furthermore, it is understood and contemplated that features specifically discussed for one seal embodiment may be adopted for inclusion with another seal embodiment, provided the functions are compatible. Accordingly, it is to be understood that the seal assemblies and their components constructed according to principles of this invention may be embodied other than as specifically described herein. The seal assemblies and associated methods are also defined in the following claims.

What is claimed is:

1. A seal assembly comprising:
   a singularly formed seal body made of a first material and comprising two cavities that includes a first cavity and a second cavity, each cavity defined by a respective radially inner flange, having a respective sealing lip, and a respective radially outer flange, each respective radially outer flange extending axially relative to a bore of a housing and sealing against an interior surface of the bore;
   a locking ring for securing the seal assembly to the housing, the locking ring is made of a second material, is attached to the seal body, and has a flange that extends between the inner flange and the outer flange of the second cavity such that the flange of the locking ring contacts the outer flange but is spaced from the inner flange; and
   a first canted coil spring biasing the inner flange and the sealing lip of one of the two cavities;

a second canted coil spring located in the first cavity;
wherein the first canted coil spring is larger than the second canted coil spring and the two sealing lips point in opposite directions of one another.

2. The seal assembly of claim 1, wherein the locking ring comprises a cantilever beam and a notch.

3. The seal assembly of claim 2, wherein the cantilever beam is a leaf spring for biasing against the housing.

4. The seal assembly of claim 2, wherein the cantilever beam further comprises a tip, and wherein the tip points in a direction away from the sealing lip of one of the two cavities.

5. The seal assembly of claim 1, wherein one of the two cavities is larger than the other of the two cavities.

6. The seal assembly of claim 1, wherein the first canted coil spring biases against both the locking ring and the inner flange of the second cavity.

7. The seal assembly of claim 1 wherein the seal body comprises a common seal divider from which the inner flanges and the outer flanges extend to define the two cavities.

* * * * *

UNITED STATES PATENT AND TRADEMARK OFFICE
CERTIFICATE OF CORRECTION

PATENT NO. : 10,520,091 B2
APPLICATION NO. : 12/828143
DATED : December 31, 2019
INVENTOR(S) : Sidney Niknezhad It is certified that error appears in the above-identified patent and that said Letters Patent is hereby corrected as shown below:

In the Specification

In Column 2, Line 60, delete "ocking" and insert -- locking --, therefor.

In Column 4, Line 14, delete "AFLAS®." and insert -- AFLAS®, --, therefor.

In Column 4, Line 19, delete "(polyetherketone)." and insert -- (polyetherketone), --, therefor.

In Column 6, Line 28, after "housing" insert -- using --.

In Column 6, Line 36, after "housing" insert -- using --.

Signed and Sealed this
Twenty-third Day of August, 2022

Katherine Kelly Vidal
*Director of the United States Patent and Trademark Office*